United States Patent [19]
Bernard

[11] 4,150,906
[45] Apr. 24, 1979

[54] CABLE LOOP CONNECTOR

[76] Inventor: Ronald V. Bernard, Rte. 2, Box 1420, Neotsu, Oreg. 97364

[21] Appl. No.: 848,237

[22] Filed: Nov. 3, 1977

[51] Int. Cl.$^2$ ............................................. F16G 11/00
[52] U.S. Cl. ................................ 403/213; 24/115 R; 294/78 R; 403/291
[58] Field of Search ............... 403/209, 211, 213, 291; 294/78 R, 82 R; 24/115 CH

[56] References Cited

U.S. PATENT DOCUMENTS

| | | | |
|---|---|---|---|
| 424,388 | 3/1890 | Weigel | 403/211 |
| 1,644,375 | 10/1927 | Haworth | 403/213 |

FOREIGN PATENT DOCUMENTS 654132 12/1937 Fed. Rep. of Germany ..... 24/115 CH

*Primary Examiner*—Wayne L. Shedd
*Attorney, Agent, or Firm*—Oliver D. Olson

[57] ABSTRACT

A connector, by which a pair of loops at the ends of a pair of cables are connected together releasably, include a body having therethrough a longitudinal opening which is of uniform width of a first longitudinal plane and tapered in width in the second longitudinal plane perpendicular to the first plane, and a hook extending longitudinally outward from the larger width opening end of the body. The hook may extend in a plane which is offset laterally from but parallel to the second plane, or in a plane which is perpendicular to said second plane and across said tapered opening in the body.

8 Claims, 10 Drawing Figures

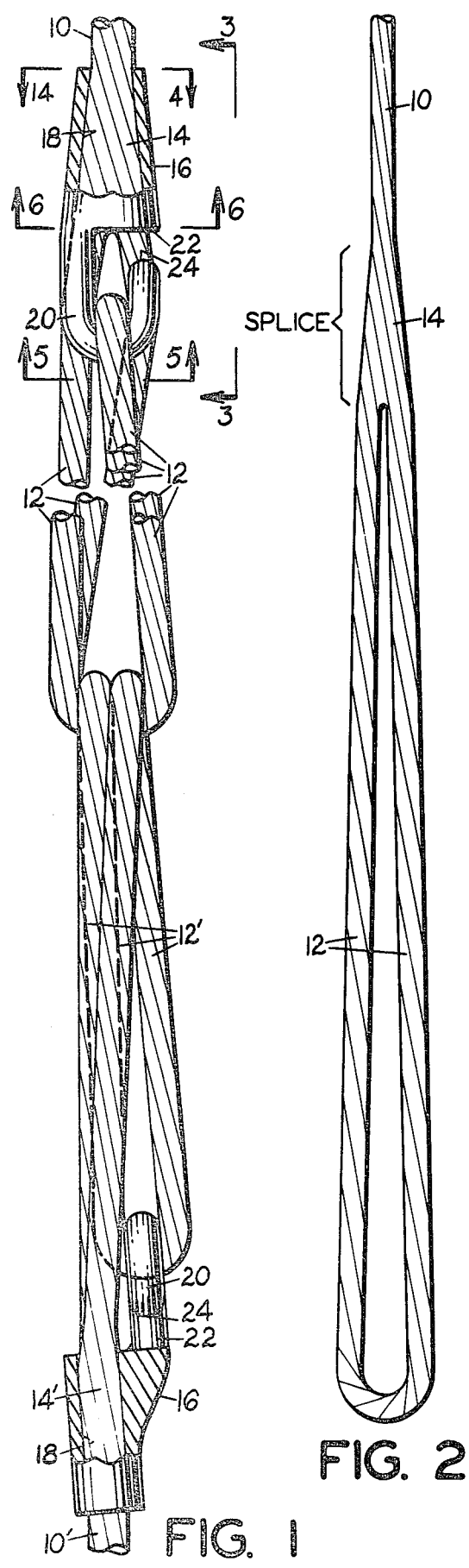

CABLE LOOP CONNECTOR

BACKGROUND OF THE INVENTION

This invention relates to cable connectors, and more particularly to a connector by which to facilitate the interconnection of the loop ends of a pair of cables.

Among the many industrial applications which utilize cables provided with eye splice or rolled splice loops at one or both ends, wide spread use of such cables is found in the logging industry. It is common practice to provide quite a few small diameter steel cables, in relatively short lengths of 100-300 feet, with eye splice or rolled splice loops at their opposite ends, for connection together to make a single length cable for extension many hundreds of feet into the forest. Such short lengths of cable are sufficiently light in weight as to be carried conveniently by an individual, where much greater lengths of such cables would have to be delivered into the forest by a tractor or other powered means. Thus, the shorter lengths of cables may be transported manually to desired sites where they may be interconnected to create the desired overall length by forming interconnected secondary loops of the adjacent loop ends of successive cables.

Heretofore, each of a pair of loop-ended cables, inwardly of its end loop, has been threaded through an opening in the end of a connector body opposite a hook, the opening extending transversely to the longitudinal axis of the connector body and hook. A single knot then is made in the cable across the body adjacent the transverse opening. The hook serves to receive releasably therein the outer end of the cable loop, whereby the loops at the ends of the pair of cables may be formed into secondary loops which have been looped together.

The single knot thus formed to secure the connector in permanent position, forms a bulky mass of cable. This bulky mass tends to snag on stumps, branches, rocks and other external objects as the interconnected cable is drawn over the ground. The bulky mass of the knot also presents an obstruction to the passage of the cables over pulleys as are employed in the normal logging operations. Still further, the bulky mass is subject to excessive wear which contributes to premature breaking of the cable.

SUMMARY OF THE INVENTION

In its basic concept, the cable loop connector of this invention comprises a body having therethrough a longitudinal opening which tapers in one longitudinal plane, and a hook extending longitudinally outward from the larger opening end of the body.

It is by virtue of the foregoing basic concept that the principal objective of this invention is achieved; namely, to overcome the aforementioned disadvantages and limitations of prior cable loop connectors.

Another objective of this invention is the provision of a cable loop connector of the class described which eliminates the requirement of the securing knot which heretofore has contributed to the disadvantages and limitations previously described.

A further objective of this invention is the provision of a cable loop connector of the class described which is of simplified construction for economical manufacture.

The foregoing and other objects and advantages of this invention will appear from the following detailed description, taken in connection with the accompanying drawings of preferred embodiments.

BRIEF DESCRIPTION OF THE DRAWINGS

FIG. 1 is a foreshortened, fragmentary plan view showing a pair of end loop type cables interconnected by secondary loops made by means of cable loop connectors embodying the features of this invention, portions of the connectors being broken away to disclose internal details.

FIG. 2 is a fragmentary plan view of an end portion of a cable having a loop formed therein by means of an eye splice or rolled splice.

FIG. 3 is a side elevation of the cable loop connector as viewed in the direction of the arrows 3—3 in FIG. 1, the cable having been removed for clarity.

FIG. 4 is an end view as viewed in the direction of the arrows 4—4 in FIG. 1, the cable having been removed for clarity.

FIG. 5 is an end view as viewed in the direction of the arrows 5—5 in FIG. 1, the cable having been removed for clarity.

FIG. 6 is a transverse sectional view taken along the line 6—6 in FIG. 1, the cable having been removed for clarity.

FIG. 7 is a side elevation, similar to FIG. 3, showing a second form of cable loop connector embodying the features of this invention.

FIG. 8 is a longitudinal section taken on the line 8—8 in FIG. 7.

FIG. 9 is an end view as viewed in the direction of the arrows 9—9 in FIG. 7.

FIG. 10 is an end view as viewed in the direction of the arrows 10—10 in FIG. 7.

DESCRIPTION OF THE PREFERRED EMBODIMENTS

FIG. 2 illustrates an end portion of a cable 10 which is provided with a closed loop 12 formed by the technique of an eye or rolled splice 14, both of which are well known to those skilled in the art. In either form the splice is tapered in width in one longitudinal plane and is of uniform width in the longitudinal plane perpendicular to said one longitudinal plane. The tapered width of the splice also is shown in association with the upper connector in FIG. 1, while the uniform width at the splice is shown in association with the connector at the bottom of FIG. 1.

The cable loop connector of this invention includes a body portion 16 which is provided with a longitudinal opening 18 through it. In one longitudinal plane the said opening is tapered in width substantially to match the taper of the splice. This is illustrated by the top connector in FIG. 1 and by the connector in FIG. 8. In the longitudinal plane perpendicular to the plane of the taper, the opening is of substantially uniform width, as illustrated by the bottom connector in FIG. 1 and by the connector in FIG. 7. This uniform width preferably is only slightly larger than the diameter of the cable 10 with which the connector is to be utilized.

The connector also includes an open hook portion 20 which extends in the longitudinal direction of the body portion 16 longitudinally outward from the larger width opening end 22 of the body portion. The terminal, free end 24 of the hook is spaced from the larger opening end 22 of the body portion a distance slightly greater than the diameter of the cable 10 to be utilized with the connector. The intermediate retainer portion 26 of the hook portion also provides a space preferably only slightly larger than the diameter of the cable.

In the embodiment illustrated in FIGS. 1 and 3-6, the hook portion 20 is disposed in a longitudinal plane which is offset laterally from but parallel to the longitudinal plane through the tapered dimension of the opening 18 through the body portion. By this construction the portion of the loop end 12 of the cable adjacent the splice 14 extends longitudinally outward along side the hook portion, as illustrated by the bottom connector in FIG. 1.

In the embodiment illustrated in FIGS. 7-10, the hook portion 20 is disposed in a longitudinal plane which extends perpendicular to the longitudinal plane of the tapered opening 18 through the body portion. By this construction the spaced strands 12 of the cable which form the loop immediately adjacent the splice 14 extend longitudinally outward to opposite sides of the hook portion.

A comparison between FIGS. 5 and 10 shows that the embodiment of FIGS. 7-10 is slightly more compact than the first embodiment, whereby to reduce to absolute minimum the transverse dimensions of a connected cable assembly. Both embodiments reduce this transverse dimension to an extent that the interconnected cables are readily wound upon drums, pass over pulleys with no difficulty and do not hang up on brush, limbs or other obstacles. Moreover, the looped cables do not tend to uncouple from the connectors when the interconnect cables are slackened from a load.

It will be understood, of course, that a connector is associated permanently with each end loop 12 provided on a cable. Thus, the connector is inserted onto the cable 10 before the splice 14 is made. Thereafter, the connector is installed at the splice, by matching the tapered opening to the tapered dimension of the splice.

Referring to FIG. 1, there is illustrated the interconnection of the loop ends 12 and 12' of a pair of cables 10 and 10'. It is to be noted that one of the end loops, for example the end loop 12' associated with the bottom connector, is connected to the hook portion 20 of its associated connector, to form a secondary loop of the main loop 12'. Then, the main loop 12 of the upper cable 10 is threaded through the secondary loop of the lower cable 10' and then doubled back and connected to the hook portion 20 of its associated connector, thereby forming a secondary loop of the main loop 12 of the upper cable 10. The interconnected secondary loops of the upper and lower cables thus provided maximum coupling strength.

When the interconnected cables are utilized in moving a load, for example one or more logs, the interlooped cables are pulled taut. In this manner the looped portions of the cables are reduced to minimum cross sectional bulk, and since they are made of steel, the bends take on a substantially permanent set. Accordingly, the interconnected cables are retained in quite stable orientation relative to each other, and the portion of each main loop engaged in the associated hook portion tends to remain in connected position. Said connected position also is assured by the limited opening provided between the terminal end 24 of the hook portion 20 and the adjacent end 22 of the connector body portion, as previously mentioned.

It will be apparent to those skilled in the art that various changes may be made in the size, shape, and arrangements of components described hereinbefore without departing from the spirit of this invention.

Having now described my invention and the manner in which it may be used, I claim:

1. A one piece cable loop connector, comprising:
   a. a body portion having therethrough a longitudinal opening which is of substantially uniform width in a first longitudinal plane and which is tapered in width in a second longitudinal plane perpendicular to said first longitudinal plane, and
   b. an open hook portion extending longitudinally from the wider opening end of the body portion,
   c. the terminal end of the open hook portion facing said wider opening end of the body portion.

2. The cable loop connector of claim 1 wherein the terminal end of the open hook portion is spaced from the wider opening end of the body portion a distance substantially the same as the uniform width of the opening through the body portion.

3. The cable loop connector of claim 1 wherein the open hook portion is disposed in a longitudinal plane which is parallel to but spaced laterally from said second longitudinal plane.

4. The cable loop connector of claim 1 wherein the open hook portion is disposed in a longitudinal plane which is perpendicular to said second longitudinal plane.

5. In combination with a cable having a splice-formed loop at its end, wherein the width of the splice portion in a first longitudinal plane is substantially uniform throughout its length and wherein the width of the splice portion in a second longitudinal plane perpendicular to said first longitudinal plane tapers from its inner end adjacent the loop to narrower width at its outer end, a connector for forming of said cable loop a secondary cable loop for coupling a pair of such cables together in end-to-end relation, comprising:
   a. a body portion having therethrough a longitudinal opening which is of substantially uniform width in a first longitudinal plane and which is tapered in width in a second longitudinal plane perpendicular to said first longitudinal plane, and
   b. an open hook portion extending longitudinally from the wider opening end of the body portion,
   c. the terminal end of the open hook portion facing said wider opening end of the body portion,
   d. the uniform width and tapered width of the opening through the body portion being slightly greater than the corresponding widths of the cable splice.

6. The combination of claim 5 wherein the terminal end of the open hook portion is spaced from the wider opening end of the body portion a distance substantially the same as the uniform width of the opening through the body portion.

7. The combination of claim 5 wherein the open hook portion is disposed in a longitudinal plane which is parallel to but spaced laterally from said second longitudinal plane.

8. The combination of claim 5 wherein the open hook portion is disposed in a longitudinal plane which is perpendicular to said second longitudinal plane.

* * * * *